United States Patent [19]

Yeoman et al.

[11] Patent Number: 5,788,894
[45] Date of Patent: Aug. 4, 1998

[54] HIGH CAPACITY VAPOR-LIQUID CONTACT TRAY

[75] Inventors: Neil Yeoman, Merrick, N.Y.; Chang-Li Hsieh, Carlisle; Vui Van Le, Malden, both of Mass.; O. Jeffrey Berven, Wichita, Kans.

[73] Assignee: Koch Engineering Company, Inc., Wichita, Kans.

[21] Appl. No.: 824,681

[22] Filed: Mar. 26, 1997

Related U.S. Application Data

[60] Provisional application Nos. 60/014,902 Apr. 5, 1996, 60/016,727 May 2, 1996, and 60/017,395 May 15, 1996.

[51] Int. Cl.$^6$ ............................................. B01F 3/04
[52] U.S. Cl. .............................. 261/114.3; 261/114.5
[58] Field of Search ......................... 261/114.1, 114.3, 261/114.5

[56] References Cited

U.S. PATENT DOCUMENTS

| | | | |
|---|---|---|---|
| 2,784,953 | 3/1957 | Ng | 261/114.3 |
| 3,282,576 | 11/1966 | Bruckert et al. | 261/114.3 |
| 3,417,975 | 12/1968 | Williams et al. | 261/114.3 |
| 3,463,464 | 8/1969 | Nutter et al. | 261/114.1 |
| 3,759,498 | 9/1973 | Matsch | 261/114.3 |
| 4,101,610 | 7/1978 | Kirkpatrick et al. | 261/114.3 |
| 4,499,035 | 2/1985 | Kirkpatrick et al. | 261/114.3 |
| 4,956,127 | 9/1990 | Binkley et al. | 261/114.1 |
| 5,164,125 | 11/1992 | Binkley et al. | 261/114.1 |
| 5,360,583 | 11/1994 | Nutter | 261/114.3 |
| 5,468,425 | 11/1995 | Nutter | 261/114.5 |
| 5,480,595 | 1/1996 | Yeoman et al. | 261/114.1 |

FOREIGN PATENT DOCUMENTS

| | | |
|---|---|---|
| 690798 | 4/1953 | United Kingdom . |
| 1449278 | 9/1976 | United Kingdom . |

*Primary Examiner*—C. Scott Bushey
*Attorney, Agent, or Firm*—Shook, Hardy & Bacon L.L.P.

[57] ABSTRACT

A vapor-liquid contact tray is provided which includes a plurality of openings and associated fixed roof structures which redirect vapor flowing vertically upward through the openings to horizontal flow paths. Each fixed roof structure includes a generally planar deflector which overlies and is spaced above the associated opening in the tray. The deflector is joined to the tray by end plates connected at one end to the tray and at the other end to the deflector. In one embodiment the deflector is generally parallel to the tray and divides the vertically flowing vapor stream into roughly equal oppositely flowing vapor streams. In other embodiments, the deflector is inclined in relation to the tray to preferentially direct the vapor stream in one direction or to split the vapor stream into equal portions which are directed in the same general direction. The openings and deflectors are arranged to more uniformly push the vapor and hence the liquid into and through those areas of the tray where liquid stagnation and gradients are a problem. The fixed roof structures in the row of apertures closest to liquid receiving area at the inlet end of the tray are oriented so that the end plates shield the openings against entry of liquid leaving the receiving area. Louvre-type fixed roof structures are used in association with at least some of the openings in the first row so that more rapid frothing of the liquid can be achieved with reduced incidence of liquid weeping through openings in successive rows of openings.

23 Claims, 4 Drawing Sheets

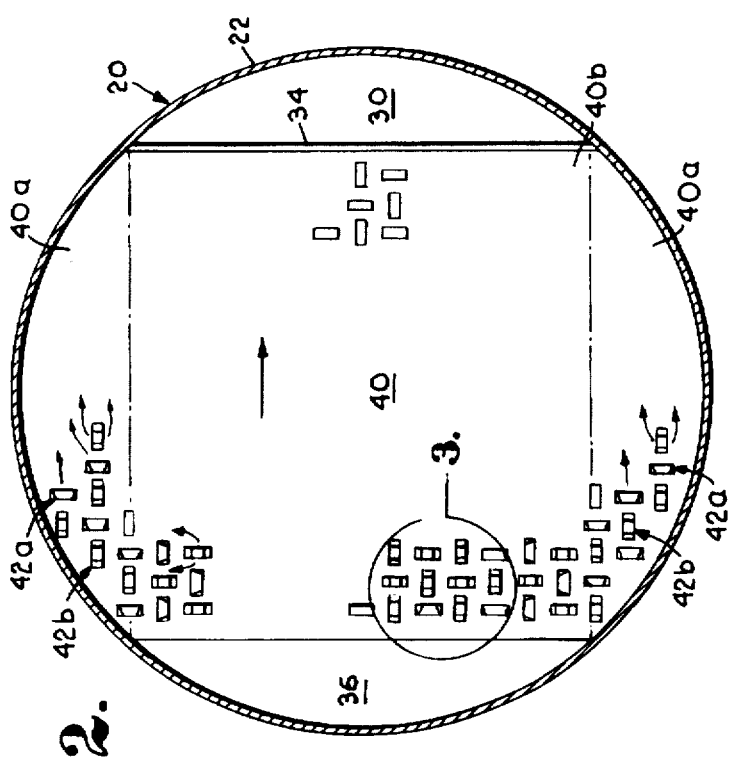
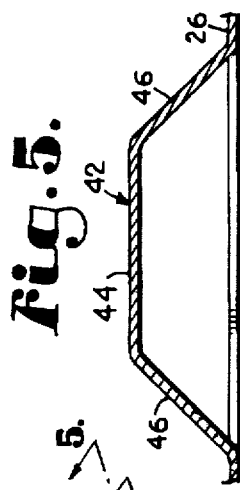
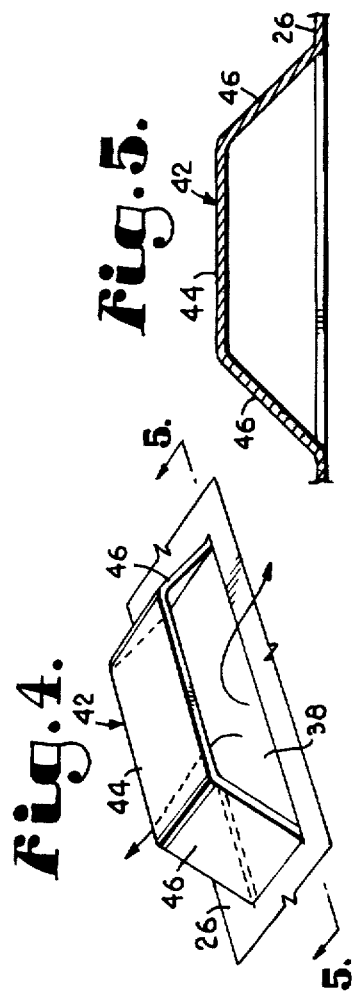
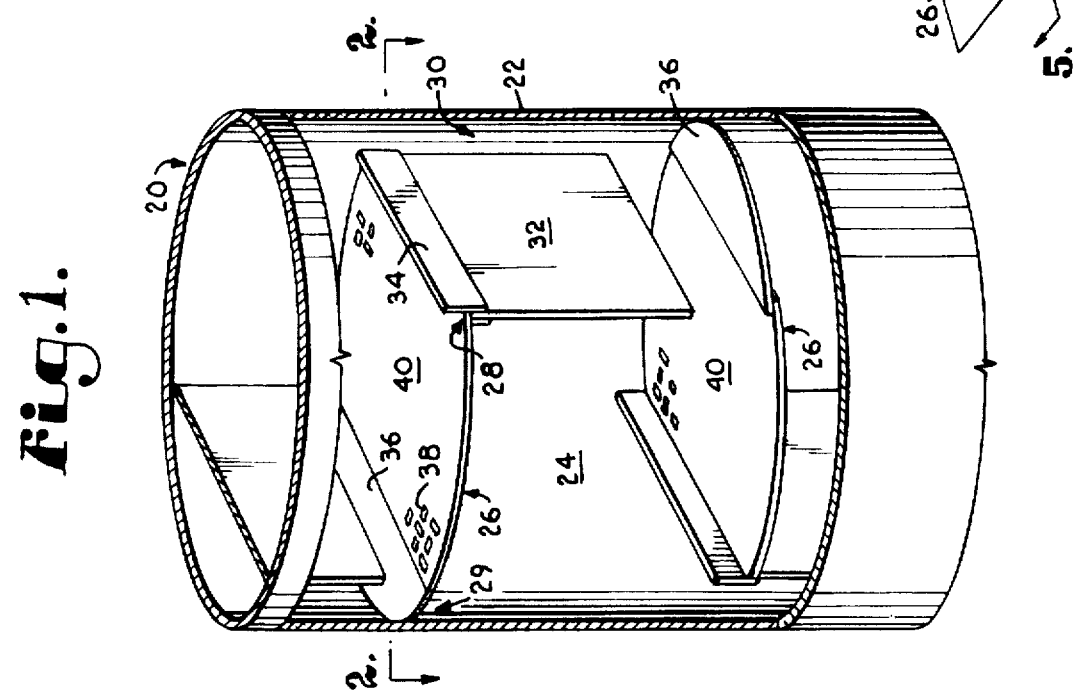

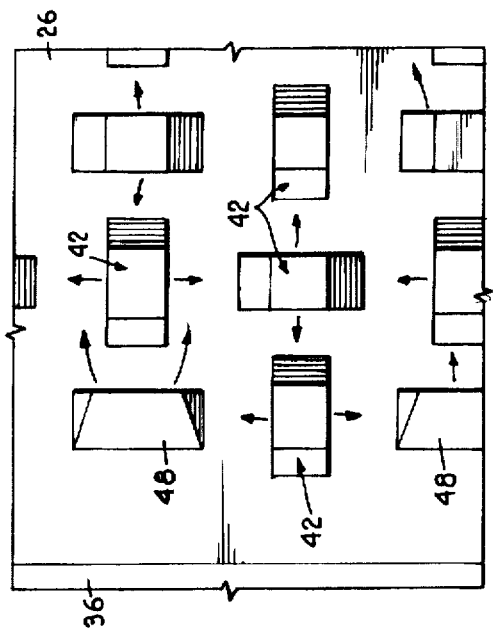
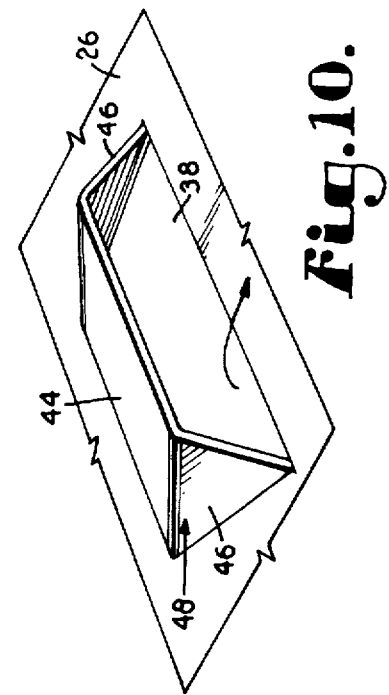
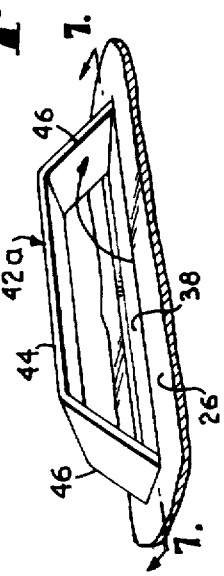
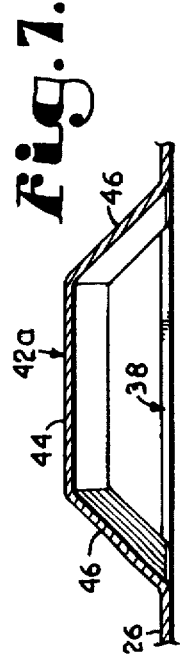
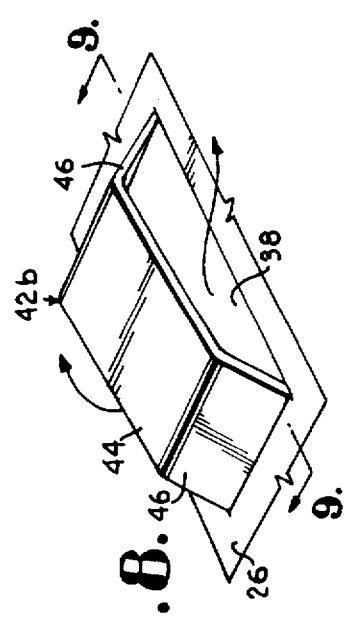
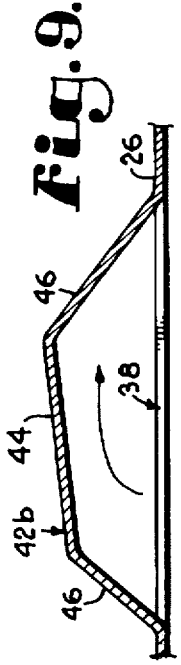

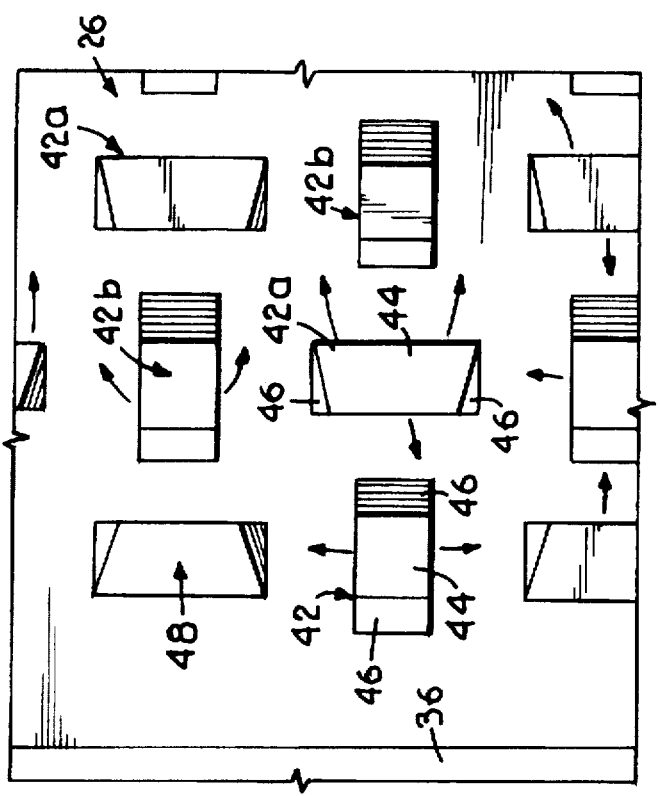

HIGH CAPACITY VAPOR-LIQUID CONTACT TRAY

CROSS-REFERENCE TO RELATED APPLICATIONS

This application claims the benefit of U.S. Provisional Application No. 60/014,902, filed Apr. 5, 1996, U.S. Provisional Application No. 60/016,727, filed May 2, 1996, and U.S. Provisional Application No. 60/017,395, filed May 14, 1996.

BACKGROUND OF THE INVENTION

This invention relates in general to mass transfer and exchange columns and, more particularly, to vapor-liquid contact trays employed within such columns.

Vapor-liquid contact trays are used in mass transfer or exchange columns to facilitate contact between upwardly flowing vapor streams and downwardly flowing liquid streams. The trays are horizontally disposed within the columns to provide a horizontal surface across which the liquid streams may flow. The trays are typically formed from a solid sheet-like material and contain a plurality of apertures which allow vapor to flow upwardly through the tray for interaction with liquid flowing across the top surface of the tray. In trays known as sieve trays, the apertures are sized small enough so that during operation of the column the pressure of the vapor passing upwardly through the apertures restricts or prevents liquid from passing downwardly through the apertures. In other types of trays, movable valves or stationary structural elements such as bubble caps can be provided over the apertures to seal against the downward passage of liquid.

Downcomers are used in combination with the vapor-liquid contact trays described above to provide a passageway for liquid to pass downwardly from one tray to an underlying tray. In single pass tray arrangements, the downcomers are provided at opposite ends of vertically adjacent trays so the liquid must flow completely across one tray from the inlet end to the outlet end before it enters the downcomer for passage to the next lower tray. The liquid then flows in the opposite direction across the lower tray and enters the associated downcomer for passage to and across lower trays in the same back and forth fashion. In double-pass tray arrangements, the tray is split into two streams which travel in opposite directions on each tray. A center downcomer is provided on every other tray and two end downcomers are placed at opposite ends of intermediate trays to provide the double pass flow pattern.

A weir is also typically used at the outlet end of vapor-liquid contact trays to cause liquid to accumulate on the top surface of the tray for enhanced interaction with the vapor bubbling upwardly through the apertures in the tray deck. The area of the tray deck which contains the apertures in vapor-liquid contact trays is referred to as the "active area" of the tray because the vapor-liquid interaction occurs above the tray in this area. The active area typically does not include the area at the inlet end of the tray deck which lies immediately below the outlet of the downcomer which is associated with the overlying tray. This area of the tray below the downcomer outlet is referred to as the downcomer receiving area and is typically a solid plate which receives the vertically flowing discharge from the downcomer and redirects it horizontally to flow across the tray.

One problem associated with conventional trays of the type described above is the tendency for liquid to flow in a non-uniform manner across the tray. Because the width of a circular tray increases in the direction of liquid flow from the inlet end to the midpoint of the tray and then decreases from the midpoint to the outlet end, the liquid tends to preferentially flow along the center portion of the tray. This often results in decreased tray performance as liquid stagnates or forms non-uniform gradients along the lateral edges or other portions of the tray. Previous attempts to reduce liquid stagnation and non-uniform gradients have included the use of apertures which redirect vapor from a vertical to horizontal flow path. The apertures thus cause liquid in the vicinity of the apertures to flow in the direction of the redirected vapor. These apertures are spaced about the tray and may be concentrated in those areas where liquid stagnation or gradients tend to form. Regular sieve-type openings are used in combination with the apertures, such as illustrated in U.S. Pat. No. 3,417,975 to Williams et al. and U.S. Pat. No. 3,282,576 to Bruckert et al. While this combination of vapor redirecting apertures and sieve-type openings can achieve the desired results, fabrication of the trays is a time consuming process because separate machinery must be used to first form the sieve-type openings and then the vapor redirecting apertures. A need has thus arisen for an improved tray which may be more easily fabricated and reduces liquid stagnation and undesirable gradients across and along the edges of the tray.

Another important consideration in the design of vapor-liquid contact trays is the desire to increase the vapor handling capacity and thus the effectiveness of the tray. In sieve trays, this is typically accomplished by increasing the number and/or size of apertures to increase the open area on the trays. The performance of the tray, however, may suffer at lower than design vapor flow rates as increased amounts of liquid pass or "weep" through the open areas. To overcome this problem, bubble caps or pressure responsive valves can be provided over the openings to reduce the amount of liquid weeping through the openings at low vapor flow rates. Valves have the added advantage of deflecting vapor from a vertical flow path to a horizontal flow path which is believed to enhance tray performance. Because these valves significantly increase the cost and maintenance required for the trays it is desirable at least in some applications to utilize fixed deflectors over the open areas.

SUMMARY OF THE INVENTION

It is an object of this invention to provide a vapor-liquid contact tray with fixed roof apertures which cause directional vapor flow to facilitate liquid flow across the tray so that liquid stagnation is less likely to occur and more uniform flow liquid flow is achieved, including along the lateral edges of the tray.

It is another object of this invention to provide a vapor-liquid contact tray with apertures having fixed roof structures which cause directional vapor flow to facilitate the desired liquid flow across the tray and which are arrayed so that the fixed roof structures shield against liquid entry into the apertures positioned adjacent the liquid receiving area of the tray.

It is a further object of this invention to provide a vapor-liquid contact tray with apertures having some of the described fixed roof structures oriented adjacent the liquid receiving area of the tray so that the vapor is deflected in the direction of outlet end of the tray to cause liquid to be pulled from the downcomer receiving area under the influence of the vacuum resulting from the deflected vapor, thereby facilitating more rapid frothing of the liquid and more efficient mass transfer between the liquid and vapor.

It is a still further object of this invention to provide a vapor-liquid contact tray with fixed roof apertures to provide more uniform liquid flow across the tray and which also permit increased vapor handling capacity to be achieved with acceptable levels of liquid entrainment and weeping.

It is yet another object of this invention to provide vapor-liquid contact trays which provide the desired uniform liquid flow and mass transfer efficiency using only fixed roof apertures rather than combinations of such apertures and sieve-type openings so that the tray can be more readily fabricated without the separate processing steps that would be required to form both fixed roof apertures and sieve-type openings.

To accomplish these and other related objects of the invention, a vapor-liquid contact tray is provided for placement within a mass transfer column to facilitate contact and interaction between ascending vapor and descending liquid. The tray comprises:

- an at least partially planar plate having a liquid receiving area at an inlet end for underlying a discharge end of an overlying downcomer and receiving liquid therefrom;
- a downcomer positioned at an outlet end of the plate for removing liquid from the plate and directing it to an underlying tray;
- a plurality of openings in said plate in an active area outside of said liquid receiving area, said openings being sized to permit upward passage of vapor for interaction with liquid flowing across said plate from the inlet end to the outlet end, said openings being arrayed with a row of openings extending along and adjacent to said liquid receiving area; and
- fixed roof structures associated with each of said openings, each of said fixed roof structures having a deflector which overlies and is spaced above the associated opening for contacting vapor flowing vertically upward through the associated opening and deflecting the vapor to one or more generally horizontal flow paths, said fixed roof structures further comprising end plates which join opposed ends of the deflector to the plate adjacent said associated opening, some of the fixed roof structures associated with said openings in the first row of openings being oriented to place the end plates facing the liquid receiving area to deflect liquid leaving the liquid receiving area above and around the associated openings, substantially all of the remaining fixed roof structures associated with said openings in the first row of openings having the deflectors joined to the plate along an edge closest to the liquid receiving area to deflect liquid leaving the liquid receiving area above and around the associated openings and to redirect substantially all of the vapor flowing upwardly from the associated openings in a direction toward the outlet end of the plate to facilitate frothing of the liquid by mixing with said vapor along said first row of openings.

In another aspect, the invention is directed to a method of operating the tray to provide more uniform liquid flow and to increase the vapor handling capacity and effectiveness of the tray.

BRIEF DESCRIPTION OF THE DRAWINGS

In the accompanying drawings which form a part of the specification and are to be read in conjunction therewith and in which like reference numerals are used to indicate like parts in the various views:

FIG. 1 is a fragmentary perspective view of a mass transfer column employing vapor-liquid contact trays constructed in accordance with the present invention;

FIG. 2 is a top plan view of the column taken in horizontal section along line 2—2 of FIG. 1 in the direction of the arrows and showing one of the vapor-liquid contact trays;

FIG. 3 is an enlarged fragmentary top plan view of the vapor-liquid contact tray taken within the area designated by the numeral 3 in FIG. 2;

FIG. 4 is an enlarged, fragmentary perspective view of one embodiment of the fixed roof apertures formed in the vapor-liquid contact trays;

FIG. 5 is a side elevation view of the fixed roof aperture shown in FIG. 4 and taken along line 5—5 of FIG. 4 in the direction of the arrows;

FIG. 6 is an enlarged, fragmentary perspective view of a variation of the fixed roof aperture in which the roof slopes from side to side;

FIG. 7 is a side elevation view of the fixed roof aperture shown in FIG. 6 and taken along line 7—7 of FIG. 6 in the direction of the arrows;

FIG. 8 is an enlarged, fragmentary perspective view of another variation of the fixed roof aperture in which the roof slopes from one end to the other;

FIG. 9 is a side elevation view of the fixed roof aperture shown in FIG. 8 and taken along line 9—9 of FIG. 8 in the direction of the arrows;

FIG. 10 is an enlarged perspective view of another embodiment of the fixed roof apertures positioned in the vapor-liquid contact tray in the first row of apertures at the inlet end of the tray;

FIG. 11 is an enlarged fragmentary top plan view of another embodiment of the vapor-liquid contact tray employing the variations of the fixed roof apertures shown in FIGS. 6–10.

DESCRIPTION OF THE PREFERRED EMBODIMENTS

Figure 12:
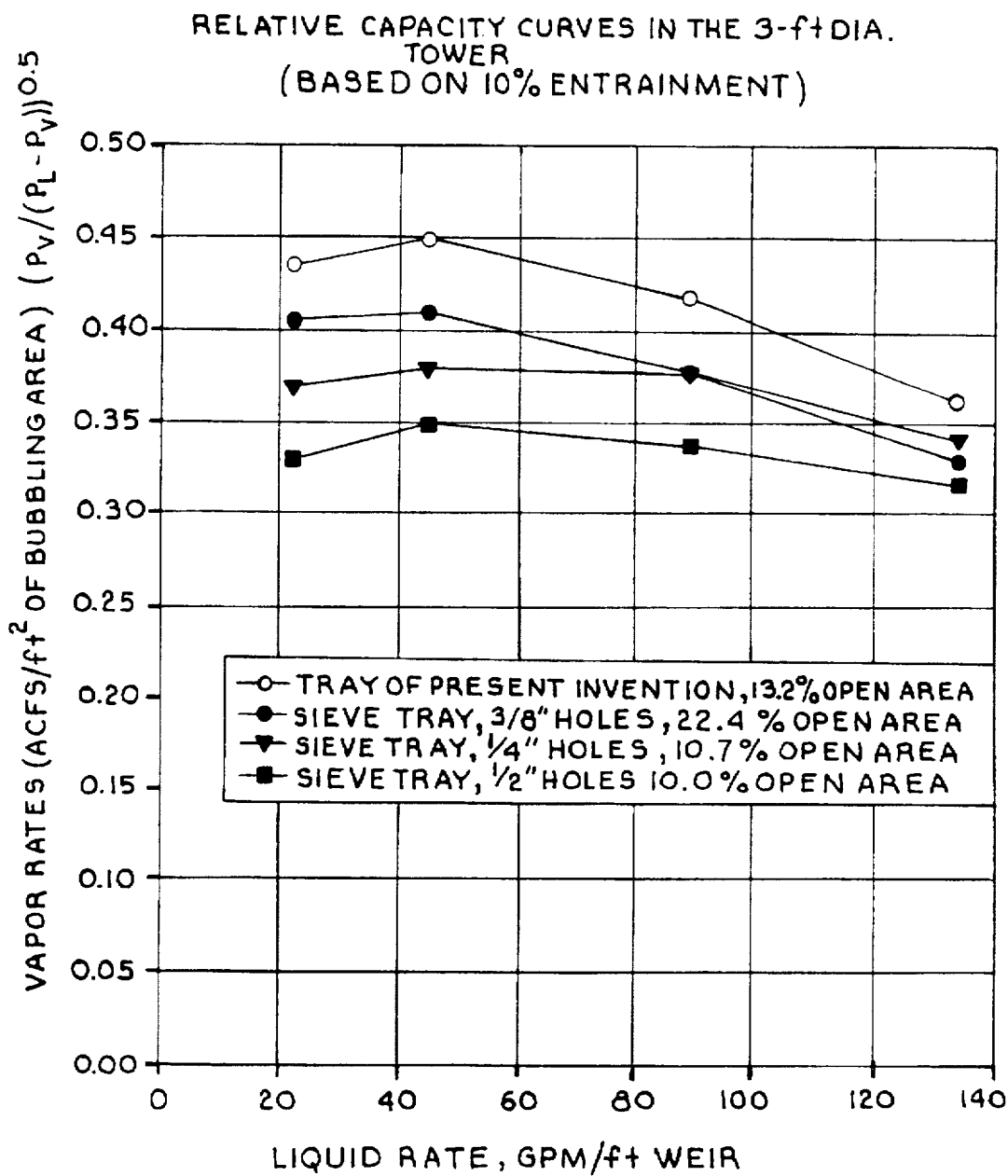
FIG. 12 is a graph comparing the vapor handling capacity of the vapor-liquid contact tray of the present invention with conventional sieve trays.

Referring now to the drawings in greater detail, and initially to FIG. 1, a mass transfer or heat exchange column is designated generally by the numeral 20 and comprises a cylindrical external shell 22 which defines an open interior region 24 in which a plurality of vapor-liquid contact trays 26 of the present invention are located.

Column 20 is of the type used for processing liquid and vapor streams, including to obtain fractionation products. The column 20 is vertically elongated and may be of any suitable configuration, including polygonal, instead of the cylindrical shape which is illustrated. The dimensions of the column 20 may be selected as desired for the intended processing operations to be conducted therein. Likewise, the materials selected for the external shell can be selected from various materials which are suitably rigid and compatible with the processing operations.

Only a portion of column 20 is illustrated because the general structure of these types of columns is well known to those of skill in the art. One or more liquid streams can be directed to the column and one or more vapor streams can also be directed to the column or generated within the column in a known manner. Internals such as beds of packing may typically be located in areas above and/or below the illustrated portion of the column containing the trays 26 in order to carry out the desired processing of the liquid and vapor streams. Other appropriate column components such as connections and lines for feed, product removal and reflux streams, and reboilers, condensers and the like are not illustrated because of their conventional nature.

The vapor-liquid contact trays 26 of the present invention are generally horizontally disposed with the vertical spacing between adjacent trays being selected based on known process parameters. Each tray 26 is generally planar and extends completely across the horizontal cross section of the column 20. The trays 26 may be formed from sheet material and will typically, but not necessarily, be constructed from various metals which are compatible with the vapor and liquid processing occurring within the column 20. Suitable brackets (not shown) are used to support the trays on the inner face of the column shell 22.

Each tray 26 has an opening at an outlet end 28 which is located adjacent a downcomer 30 which provides a passageway for liquid to flow downwardly from one tray to an inlet end 29 of the next underlying tray. The downcomer 30 is formed by a generally planar, vertically extending wall 32 which is connected at its opposed lateral ends to the column shell 22 so that the wall 32 and shell 22 form a liquid confining passage. It will, of course, be appreciated that additional walls can be provided instead of using all or part of the shell 22 in the downcomer construction, such as when the downcomer is located elsewhere on the tray. The downcomer wall 32 is joined to the outlet end 28 of the tray 26 and extends downwardly to a position a preselected distance above the underlying tray 26.

The downcomers 30 are located at opposite ends of successive trays 26 so that liquid must flow completely across each tray in a back and forth manner as it descends through the column 20. This type of flow pattern is referred to as a single pass arrangement because a single liquid stream flows across each tray 26 from the inlet end 29 to outlet end 28. It will be appreciated that the principles of the present invention are also applicable to double pass and other multiple pass trays in which two are more downcomers are positioned on each tray 26 and the single liquid stream is split into two or more streams.

Each tray 26 also includes an optional weir 34 which extends upwardly above the tray 26 to cause liquid to accumulate to a preselected depth on the tray before it spills over the weir and enters the downcomer 30. The weir 34 is typically formed as a vertical extension of downcomer wall 32, but it can be a separate component if desired. The weir 34 is typically of a height such that it terminates at a level above the lower discharge end of the downcomer 30 associated with the overlying tray 26. This causes the discharge end of the downcomer to be submerged below the liquid level on the tray to seal against vapor flowing upwardly into the downcomer 30.

Turning now additionally to FIG. 2, each tray 26 preferably includes a generally imperforate liquid receiving area 36 at its inlet end 29. The liquid receiving area 36 is generally planar and is sized to substantially completely underlie the lower discharge end of the overlying downcomer 30. The liquid receiving area 36 serves to deflect the downward momentum of the discharged liquid and redirect it across the tray 26 in the direction of the outlet end 28. Although the liquid receiving area 36 is generally imperforate, directional louvres or other perforate structures of the type disclosed in U.S. Pat. No. 5,480,595, which is incorporated herein by reference in its entirety, may be included in the liquid receiving area if desired.

Turning additionally to FIGS. 3–5, each tray 26 includes a plurality of generally uniformly spaced openings 38 which extend completely through the tray 26 in a region between the liquid receiving area 36 and the downcomer 30 which removes liquid from the tray. The openings 38 are rectangular in shape, but could be other configurations if desired, and serve to allow vapor to pass upwardly through the tray 26 for interaction with liquid flowing across the top surface of the tray. The region of the tray containing these openings 38 is known as an "active area" 40 because of the vapor-liquid interaction which occurs thereon.

Each opening 38 is covered by one of various types of fixed roof structures. One type of fixed roof structure 42 is illustrated in FIGS. 4 and 5 and comprises a planar and generally rectangular deflector 44 which is spaced above the opening 38 and is generally planar with the tray 26. The fixed roof structures 42 also include inclined planar and rectangular end plates 46 which join the opposed ends of the deflector 44 to the tray 26. The end plates 46 not only serve to attach the deflector 44 to the tray, but also close the ends of the long axis of the rectangular opening 38. Vapor flowing upwardly through the opening 38 is thus divided into two generally equal portions and forced to flow in opposite horizontal directions along the short axis of the opening after being deflected by the deflector 44 of the fixed roof structure 42. The end plates 46 further serve to shield the opening from liquid which is flowing in the direction of the long axis of opening 38. Where needed, the end plates 46 deflect liquid around and upwardly away from the opening 38 to reduce the opportunity for the momentum of the liquid to cause the liquid to enter the opening by overcoming the upward pressure exerted by the vapor flowing through the opening. It will be appreciated that the deflector 44 and inclined end plates 46 may be formed from those portions of the tray 26 which are removed to form the associated opening 38, such as using techniques known to those of skill in the art. The deflector 44 may also be formed into other shapes, including a square, trapezoid, ellipse, diamond or circle.

The fixed roof structures 42 can be varied in a number of respects and still accomplish the desired objectives of causing deflection of the vapor passing through openings 38 and shielding the openings 38 against entry of liquid. For example, the deflector 44 and end plates 46 can be formed as an arched structure. Alternatively, as shown in FIGS. 6 and 7, the deflector 44 and end plates 46 can be formed as trapezoids which are tilted in one direction to cause the vapor to be split in two unequal portions with a greater amount of vapor being preferentially funneled in one direction along the short axis of the rectangular opening 38. In a still further embodiment as shown in FIGS. 8 and 9, the deflector 44 and end plates 46 can be of rectangular construction, but with one of the end plates 46 being shorter than the other to cause the deflector to 44 to be angled upwardly along the long axis of the opening 38. In this embodiment, the vapor stream is still split into two generally equal portions but are directed at an angle between the short and long axes of the opening 38. It can thus be appreciated that the inclination of the deflector 44 and end plates 46 can be varied to cause preferential flow of vapor in one direction or to vary the angle of flow of generally equal portions of vapor.

The openings 38 are typically arrayed in a pattern with their long dimension extending either parallel or perpendicular to the direction of liquid flow across the tray 26, although in some applications the long dimension may extend at an angle between the parallel and perpendicular directions. Likewise, the long dimension of the deflector 44 will typically, but not necessarily always, extend in the same general direction as the long dimension of the associated opening. In one preferred array, the openings are placed in a plurality of generally evenly spaced rows which extend perpendicular to the direction of liquid flow. The openings 38 in successive rows are aligned in columns in a direction parallel to the liquid flow to form a generally square grid of openings 38 distributed across the active area 40 of the tray 26. The direction of the long dimension of adjacent openings 38 and associated deflectors 44 in each row and column alternates from parallel to perpendicular in relation to the direction of liquid flow. This array of openings and deflectors extending in alternating directions allows vapor passing upwardly through each opening 38 to be redirected by the fixed roof structure 42 in directions where they will encounter the inclined end plates 46 of adjacent roof structures rather than the generally vertical discharge openings formed by the roof structures. In this manner, the fixed roof structures aid in the desired frothing and vapor-liquid interaction by redirecting the vertically flowing vapor to predetermined generally horizontal flow paths. By orienting the vapor discharge paths in the described manner, the momentum of the vapor is more efficiently transferred to the liquid and facilitates more uniform spreading and mixing of the liquid across the entire active area 40 of the tray 26. Other arrays of openings 38 and deflectors 44 are also possible. For example, adjacent rows of openings and deflectors can be offset to form a triangular pattern with openings in every other row being in alignment. In addition, the openings 38 and/or deflectors can all extend in the same general direction, such as parallel to the direction of liquid flow.

It has been determined that at least the first row of openings 38 along and adjacent the liquid receiving area 36 should be shielded from liquid exiting the liquid receiving area 36 because the relatively high velocity, density and momentum of the liquid may force the liquid into the openings where it would then weep through the tray. This shielding of some of the openings is accomplished by orienting the openings with their long axis extending in the direction of the outlet end 28 of the tray 26 so that the end plates 46 and deflectors 44 of the associated fixed roof structures are oriented to redirect the flow of liquid around and above the openings 38. Vapor exits these openings and roof structures in a lateral directions which are generally perpendicular to the direction of liquid flow as it exits the liquid receiving area 36, thereby further controlling liquid movement and facilitating frothing of the liquid.

In accordance with the present invention, it has unexpectedly been discovered that tray performance can be measurably increased by placement of louvre-type fixed roof structures 48 in association with some of the openings 38 in the first row of openings. The louvre-type fixed roof structures 48 are shown in FIG. 10 and are similar to structures 42 except the deflectors 44 are joined to the tray along an upstream edge so that all of the vapor exits along the discharge opening formed at the opposite or downstream edge of the deflectors. The structures 48 preferably include end plates 46 which join the ends of the deflectors 44 to the tray, but the end plates could be omitted in certain applications. As illustrated in FIG. 3, the louvre-type fixed roof structures can be used in an alternating fashion with the fixed roof structures 42 oriented as described above in the first row of openings 38. Other patterns are, of course, possible and may be preferred in certain applications. The openings 38 associated with the louvre-type fixed roof structures will typically be oriented so that the short dimension of the openings extend in the direction of the outlet end 28 of the tray 26. This orientation places the long dimension of the opening generally perpendicular to the direction of liquid flow so that vapor discharged from the openings is spread along a greater portion of the liquid exiting the liquid receiving area. It has been determined that the use of these louvre-type fixed roof structures 48 in combination with the structures 42 shields against liquid entering the associated openings 38 in the first row of openings, but also contributes to more rapid frothing of the liquid and thereby reduces the amount of liquid weeping through successive rows of openings on the tray.

It will be appreciated that the directional fixed roof structures 42a and 42b illustrated in FIGS. 6-9 can be used in place of or in combination with the fixed roof structures 42 illustrated in FIGS. 4-5. An example of this is shown in FIG. 11 where the openings in the second and successive rows of openings 38 are shielded by the directional fixed roof structures 42a and 42b. As illustrated schematically by the arrows in FIG. 11, these fixed roof structures 42a and 42b cause a greater amount of vapor to be discharged in the downstream direction in comparison to the upstream direction. The directional structures 42a and 42b thus tend to preferentially direct vapor and liquid in the downstream direction toward the outlet end 28 of the tray 26. In other embodiments such as illustrated in FIG. 2, the directional fixed roof structures 42a and 42b can be concentrated in those regions of the tray where liquid stagnation or gradients tend to occur, such as in and adjacent to lateral regions 40a of active area 40. The structures 42a and 42b are oriented to preferentially direct the vapor and liquid streams into and then through the lateral regions 40a as illustrated schematically by the arrows in FIG. 2. The other fixed roof structures 42 which divide the vapor stream into roughly equal oppositely directed portions can be concentrated in a central region 40b of active area 40 where liquid stagnation and gradients may be of less concern. In applications where liquid stagnation or gradients tend not to be of concern, such as in connection with relatively smaller diameter trays, the fixed roof structures 42 could be used throughout the entire active area rather than in combination with structures 42a and 42b. It will also be appreciated that more fixed roof structures can be located in particular regions of the tray than in other regions. For instance, the structures can be concentrated in the lateral portions 40a of the active area 40 with fewer structures being placed in the center portion of the active area 40. In still another variation, the long dimension of each of the openings 38 can extend in the general direction of liquid flow with directional fixed roof structures 42a and 42b being used to direct vapor and thus liquid through lateral portions 40a or other problem areas of the tray 26.

Turning now to FIG. 12, it can be seen that markedly improved tray performance can be achieved by utilizing the fixed roof structures 42 and 48 as described above. The tray 26 constructed in accordance with the present invention and having a total of 18.4% open area when measured in the vertical plane at the downstream edge of the structures 42 and 48 and 13.2% when measured in the horizontal plane of the associated openings 38 was tested against sieve trays having varying hole diameters and total open area. The tray 26 had a higher relative liquid and vapor capacity based on a 10% liquid entrainment rate when compared against each of the sieve trays, including those having a much higher amount of open area.

From the foregoing, it will be seen that this invention is one well adapted to attain all the ends and objects hereinabove set forth together with other advantages which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, what is claimed is:

1. A vapor-liquid contact tray for placement within a mass transfer column to facilitate contact and interaction between ascending vapor and descending liquid, said tray comprising:

an at least partially planar plate having a liquid receiving area at an inlet end for underlying a discharge end of an overlying downcomer and receiving liquid therefrom;

a downcomer positioned at an outlet end of the plate for removing liquid from the plate and directing it to an underlying tray;

a plurality of openings in said plate in an active area outside of said liquid receiving area, said openings being sized to permit upward passage of vapor for interaction with liquid flowing across said plate from the inlet end to the outlet end, said openings being arrayed with a row of openings extending along and adjacent to said liquid receiving area; and fixed roof structures associated with each of said openings, each of said fixed roof structures having a deflector which overlies and is spaced above the associated opening for contacting vapor flowing vertically upward through the associated opening and deflecting the vapor to one or more generally horizontal flow paths, said fixed roof structures further comprising end plates which join opposed ends of the deflector to the plate adjacent said associated opening, some of the fixed roof structures associated with said openings in the first row of openings being oriented to place the end plates facing the liquid receiving area to deflect liquid leaving the liquid receiving area above and around the associated openings, substantially all of the remaining fixed roof structures associated with said openings in the first row of openings having the deflectors joined to the plate along an edge closest to the liquid receiving area to deflect liquid leaving the liquid receiving area above and around the associated openings and to redirect substantially all of the vapor flowing upwardly from the associated openings in a direction toward the outlet end of the plate to facilitate frothing of the liquid by mixing with said vapor along said first row of openings.

2. The vapor-liquid contact tray as set forth in claim 1, wherein said openings have a long dimension and a short dimension in a plane in which said plate lies.

3. The vapor-liquid contact tray as set forth in claim 2, wherein said openings are arrayed such that some of said openings have their long dimension extending in a direction between the inlet end and outlet end of the plate and others of said openings have their long dimension in a generally perpendicular direction.

4. The vapor-liquid contact tray as set forth in claim 3, wherein at least some of said deflectors lie in a plane generally parallel to the plane in which the plate lies.

5. The vapor-liquid contact tray as set forth in claim 4, others of said deflectors lie in a plane inclined to the plane in which the plate lies.

6. The vapor-liquid contact tray as set forth in claim 3, wherein at least some of said deflectors lie in a plane inclined to the plane in which the plate lies.

7. The vapor-liquid contact tray as set forth in claim 3, wherein said active area of the plate includes a central portion extending end to end between the inlet and outlet ends of the plate and lateral portions on opposed sides of the central portion, at least some of said deflectors associated with openings in the lateral portions of the active area being inclined in relation to the plane in which the plate lies to preferentially deflect said vapor toward said outlet end.

8. The vapor-liquid contact tray as set forth in claim 1, wherein said liquid receiving area is generally vapor and liquid imperforate.

9. The vapor-liquid contact tray as set forth in claim 1, wherein said openings and said deflectors are generally rectangular.

10. The vapor-liquid contact tray as set forth in claim 2, wherein said deflectors have a long dimension extending in generally the same direction as the long dimension of said openings.

11. A vapor-liquid contact tray for placement within a mass transfer column to facilitate contact and interaction between ascending vapor and descending liquid, said tray comprising:

an at least partially planar plate having a liquid receiving area at an inlet end for underlying a discharge end of an overlying downcomer and receiving liquid therefrom;

a downcomer positioned at an outlet end of the plate for removing liquid from the plate and directing it to an underlying tray;

a plurality of openings in said plate in an active area outside of said liquid receiving area, said openings being sized to permit upward passage of vapor for interaction with liquid flowing across said plate from the inlet end to the outlet end, said openings being arrayed with a row of openings extending along and adjacent to said liquid receiving area; and fixed roof structures associated with each of said openings, each of said fixed roof structures having a deflector which overlies and is spaced above the associated opening for contacting vapor flowing vertically upward through the associated opening and deflecting the vapor to one or more generally horizontal flow paths, said fixed roof structures further comprising end plates which join opposed ends of the deflector to the plate adjacent said associated opening, some of the fixed roof structures associated with said openings in the first row of openings being oriented to place the end plates facing the liquid receiving area to deflect liquid leaving the liquid receiving area above and around the associated openings, substantially all of the remaining fixed roof structures associated with said openings in the first row of openings having the deflectors joined to the plate along an edge closest to the liquid receiving area to deflect liquid leaving the liquid receiving area above and around the associated openings and to redirect substantially all of the vapor flowing upwardly from the associated openings in a direction toward the outlet end of the plate to facilitate frothing of the liquid by mixing with said vapor along said first row of openings, wherein said active area of the plate includes a central portion extending end to end between the inlet and outlet ends of the plate and lateral portions on opposed sides of the central portion, at least some of said deflectors associated with openings in the lateral portions of the active area being inclined in relation to the plane in which the plate lies to preferentially deflect said vapor toward said outlet end.

12. The vapor-liquid contact tray as set forth in claim 11, wherein said openings have a long dimension and a short dimension in a plane in which said plate lies.

13. The vapor-liquid contact tray as set forth in claim 12, wherein said openings are arrayed such that some of said openings have their long dimension extending in a direction between the inlet end and outlet end of the plate and others of said openings have their long dimension in a generally perpendicular direction.

14. The vapor-liquid contact tray as set forth in claim 13, wherein at least some of said deflectors lie in a plane generally parallel to the plane in which the plate lies.

15. The vapor-liquid contact tray as set forth in claim 13, wherein said liquid receiving area is generally vapor and liquid imperforate.

16. The vapor-liquid contact tray as set forth in claim 12, wherein each of said deflectors has a long dimension which extends in generally the same direction as the long dimension of the associated opening.

17. The vapor-liquid contact tray of claim 1 positioned within a mass transfer column.

18. A vapor-liquid contact tray for placement within a mass transfer column to facilitate contact and interaction between ascending vapor and descending liquid, said tray comprising:

an at least partially planar plate having a liquid receiving area at an inlet end for underlying a discharge end of an overlying downcomer and receiving liquid therefrom;

a downcomer positioned at an outlet end of the plate for removing liquid from the plate and directing it to an underlying tray;

a plurality of openings in said plate in an active area outside of said liquid receiving area, said openings being sized to permit upward passage of vapor for interaction with liquid flowing across said plate from the inlet end to the outlet end, said active area comprising a central portion extending end to end between the inlet and outlet ends of the plate and lateral portions on opposed sides of the central portion; and fixed roof structures associated with each of said openings, each of said fixed roof structures having a deflector which overlies and is spaced above the associated opening for contacting vapor flowing vertically upward through the associated opening and deflecting the vapor to one or more generally horizontal flow paths, said fixed roof structures further comprising end plates which join opposed ends of the deflector to the plate adjacent said associated opening, at least some of the deflectors associated with openings in the central portion of the active area being positioned in a plane generally parallel to the plane in which the plate lies and at least some of said deflectors associated with openings in the lateral portions of the active area being inclined in relation to the plane in which the plate lies to preferentially deflect said vapor toward said outlet end.

19. The vapor-liquid contact tray as set forth in claim 18, wherein others of said deflectors lie in a plane inclined to the plane in which the plate lies to preferentially deflect said vapor toward said lateral portions of the active area.

20. The vapor-liquid contact tray as set forth in claim 18, wherein one of said end plates in each of fixed roof structures faces against the direction of liquid flow between the inlet and outlet ends of the tray.

21. The vapor-liquid contact tray as set forth in claim 18, wherein said openings have a long dimension and a short dimension in a plane in which said plate lies.

22. The vapor-liquid contact tray as set forth in claim 21, wherein each of said deflectors has a long dimension which extends parallel to the direction of the long dimension of the associated opening.

23. The vapor-liquid contact tray as set forth in claim 18, wherein said deflectors have a shape selected from the group consisting of rectangular, square, and trapezoid.

* * * * *